Nov. 4, 1958 L. E. STIPE 2,858,636
BRAKE ATTACHMENT FOR FISHING REELS
Filed March 26, 1956

INVENTOR.
Lester E. Stipe
BY
Atty.

United States Patent Office 2,858,636
Patented Nov. 4, 1958

2,858,636

BRAKE ATTACHMENT FOR FISHING REELS

Lester E. Stipe, Portland, Oreg.

Application March 26, 1956, Serial No. 573,809

1 Claim. (Cl. 43—25)

My invention relates to a brake in the form of an attachment for a fishing reel which will apply a more or less fixed resistance to prevent backlashing of a line when it is played off the hub of said reel, as during casting. Said brake will work through a relatively wide arc because the brake follows the peripheral surface of a helical coil of fishing line as it is paid out and reeled in, while in use.

Brakes of this general character apply pressure upon the peripheral surface of said coiled fishing line as it is wound about the drum portion of the reel. It is most common to apply said pressure by means of a finger or pad having a relatively high coefficient of friction. Other types of brakes are drags which are built into a reel, most of them being adjustable.

My invention relates particularly to that general type of brake which is either spring pressed or digitally applied. This type of brake most easily can control the line so that only sufficient pressure is applied to prevent backlash occurring without limiting the ability of the reel to spin freely and unreel when the line is cast.

I have devised an attachment which may be used with any conventional type reel and can be independently mounted and secured to the handle of a fishing rod adjacent the reel seat thereof. It is provided with a friction brake pad which bears upon the peripheral surface of the coiled line and is held by a spring bias to exercise a more or less uniform pressure even though the diameter of the coil of line on the reel varies substantially.

A further and more particular object of my invention is to provide a simple adjusting means therefor to vary the braking effect thereof.

A further object of my invention is to provide a reel in which the tightening of the securing means between the attachment and the fishing rod will also serve to fix the set pressure or braking effect.

Other and further details of my invention are hereinafter described with reference to the accompanying drawings, in which.

Figure 2:
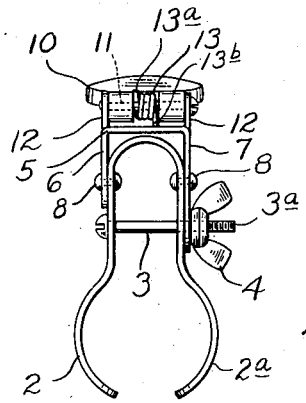
Fig. 2 is an end elevation of said attachment.

My invention is illustrated as an attachment for a fishing rod and its reel and comprises a base 1 of U-shaped construction. Said base terminates in a pair of clamping ends 2—2a which conform to and are generally complementary to the peripheral surface of the handle of a fishing rod. Said base is springy and elastic and, when undeformed, extends laterally to provide a larger compass than the cross section of said handle to which it is to be secured. A clamping screw 3 extends laterally of said base above said clamping ends, as is illustrated in Fig. 2, and is provided with a wing nut 4 tapped to engage the threaded end 3a of said clamping screw. When said thumb nut is threaded on to said end 3a, it tends to move the bifurcated portions of said base toward each other and to bring the clamping ends into tight engagement with the handle of a fishing rod to which it is to be secured.

Rotatably mounted upon said base is a mount 5, which is also bifurcated. Said mount has one relatively short leg 6 and a longer leg 7. It preferably extends about the base, as is shown in Fig. 2, and is joined thereto by pivotal connections which are illustrated in the drawings as a pair of axially aligned rivets 8. Said mount is adapted to rotate freely about said riveted connection.

Figure 1:
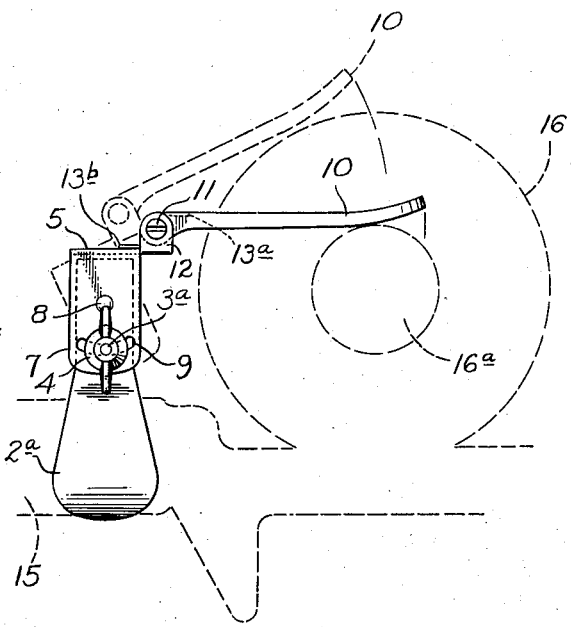
Fig. 1 is a side elevation of a device embodying my invention shown with relation to a portion of a fishing rod and its reel, which parts are shown in dashed outline.

An arcuate slot 9 is formed in the longer leg, which slot accommodates the screw 3 therein, as is shown in Fig. 1. Said slot is of preselected length so that said mount may be tipped about the riveted connection, as is shown in dotted outline in Fig. 1. That is to say, the riveted connection is formed upon an axis which is parallel to but spaced from the longitudinal dimension of the clamping screw 3. Thus, as said mount rocks through an arc indicated in dashed outline in Fig. 1, it moves over said base. The length of said rocking movement is dictated by the length of the arcuate slot 9. The relative arrangement of said mount with the base may be fixed by tightening up the wing nut upon the screw 3. Thus, simultaneously, by this one single adjustment, the attachment is locked to the rod and the adjustment is fixed.

Figure 3:
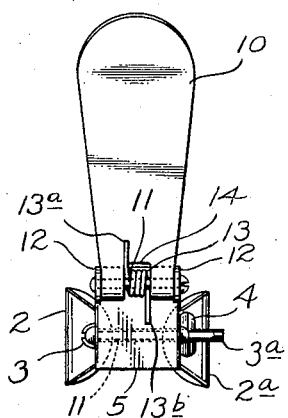
Fig. 3 is a plan view thereof.

Pivotally secured to said mount 5 is a braking finger 10. Said finger is pivotally joined to the mount by a pivot shaft 11 bearing in upstanding brackets 12 upon the mount 5. A spring 13 of the helical conformation encircles the pivot shaft and its ends 13a—13b extend laterally from the remainder and overlie the braking finger 10 and the mount 5, respectively, as is shown in Fig. 3. Thus, said spring imposes a yieldable bias upon said finger. Said ends 13a—13b extend through an aperture 14 formed in one end of the braking finger.

Said braking attachment is shown in Fig. 1 as being mounted upon a handle 15 of a fishing rod of the so-called casting type. Said fishing rod has a reel 16 carried thereby. Fishing line is wound about the hub 16a of said reel in the usual fashion, and the free end of the finger 10 bears upon the peripheral surface thereof. The braking effect of the finger 10 may be relaxed or eliminated by rotating the mount counter-clockwise as viewed in Fig. 1 and as illustrated in dotted outline. When said mount is rotated clockwise, it may be brought into frictional engagement with the line reeled about the hub 16a of the reel 16, and the amplitude of the braking effect may be increased by rotating said mount clockwise to a further degree.

Because the finger is quite long with respect to the diameter of the hub 16a and said hub is spaced substantially from the mount, the helically wound spring 13 may be distorted by adjustment and the braking effect will be more or less constant in any adjusted position.

My attachment may be secured to the handle of a fishing rod merely by backing off the wing nut 4 until the ends of the base will spread sufficiently to pass the clamping ends laterally over said handle. The finger may be depressed until it bears upon the fishing line wound about the hub 16a to exercise a predetermined pressure thereon. Then the wing nut may be threaded tightly upon the end 3a of the screw 3 until it firmly engages the handle. The resistance exerted by the finger upon the line will be constant throughout the length of all casts made therefrom. If it is desirable to increase the resistance, as is sometimes necessary when lead or other weights are varied, this may be done by backing off said wing screw, pushing downwardly upon the mount so as to rotate the mount in a clockwise direction as viewed in Fig. 1, and retightening the wing nut 4 upon the screw 3. If it is necessary or desirable to lessen the frictional resistance, this may be done by rocking the mount counterclockwise until the finger bears with a lesser effect upon the line mounted upon the hub of the reel, or until the finger is entirely free thereof. This usually can be done without relaxing the grip of the screw 3 upon the clamping ends of the base because the parts are plane and smooth.

I claim:

A brake for a fishing reel adapted to exert pressure upon a line wound upon said reel, comprising a base of U-shaped construction terminating in a pair of clamping ends generally complementary to the peripheral surface of a fishing rod, said base being elastic and, when undeformed, being of larger compass than the portion of a fishing rod to be accommodated between said clamping ends, an elongated clamping screw extending through said base and being adjustable to deform said base to move said clamping ends toward each other into gripping relation with a fishing rod, a friction brake pad, a bifurcated mount therefor, one end of said brake pad being pivotally journaled upon said mount, and a spring bias member for depressing said brake pad toward a fishing reel with which it is associated, said mount being pivotally joined to said base on journal connections rotatable about a pivotal axis spaced laterally from said clamping screw, but arranged parallel to the major dimension of said clamping screw, one portion of said bifurcated mount being apertured and extending about said clamping screw to accommodate the passing of said screw therethrough, the apertured portion of said mount permitting relative rotation of said mount upon said base, whereby when said clamping screw is adjusted to deform said base, it will also fix said mount against relative rotation with said base.

References Cited in the file of this patent

UNITED STATES PATENTS

| | | |
|---|---|---|
| 177,544 | Noe | May 16, 1876 |
| 1,774,775 | Weitz, Jr. | Sept. 2, 1930 |
| 2,158,104 | Bowen | May 16, 1939 |
| 2,303,645 | Lacy | Dec. 1, 1942 |
| 2,473,778 | Benes | June 21, 1949 |
| 2,555,824 | Stout | June 5, 1951 |